Sept. 8, 1936.   F. KUNZ ET AL   2,053,953
EMERGENCY TIRE CHAIN
Filed April 3, 1935

INVENTORS
Frederick Kunz
Stephan A. Minery
BY H. G. Manning
ATTORNEY

Patented Sept. 8, 1936

2,053,953

UNITED STATES PATENT OFFICE 2,053,953

EMERGENCY TIRE CHAIN

Frederick Kunz, Bloomfield, N. J., and Stephan A. Minery, Meriden, Conn.

Application April 3, 1935, Serial No. 14,384

1 Claim. (Cl. 152—14)

This invention relates to anti-skid devices, and more particularly to a quickly attachable and detachable emergency tire chain.

One object of this invention is to provide an emergency tire chain having a pair of cross-chains which, when in use, tightly embrace the tread section of the tire, and will not creep around the tire.

A further object is to provide an emergency tire chain of the above nature including a pair of inwardly inclined ribbed side plates, the outer ends of which are connected by a pair of tread-engaging cross-chains, and in which the inner ends of said plates are adapted to be tightly drawn together by a bolt and wing-nut, the leverage of said plates against the wheel rim causing said cross-links to be tightly held upon said tire.

A further object is to provide an emergency chain of the above nature which will be simple in construction, inexpensive to manufacture, easy to put on and take off, compact, and very efficient and durable in use.

With these and other objects in view, there has been illustrated on the accompanying drawing, one form in which the invention may be conveniently embodied in practice.

Figure 1:
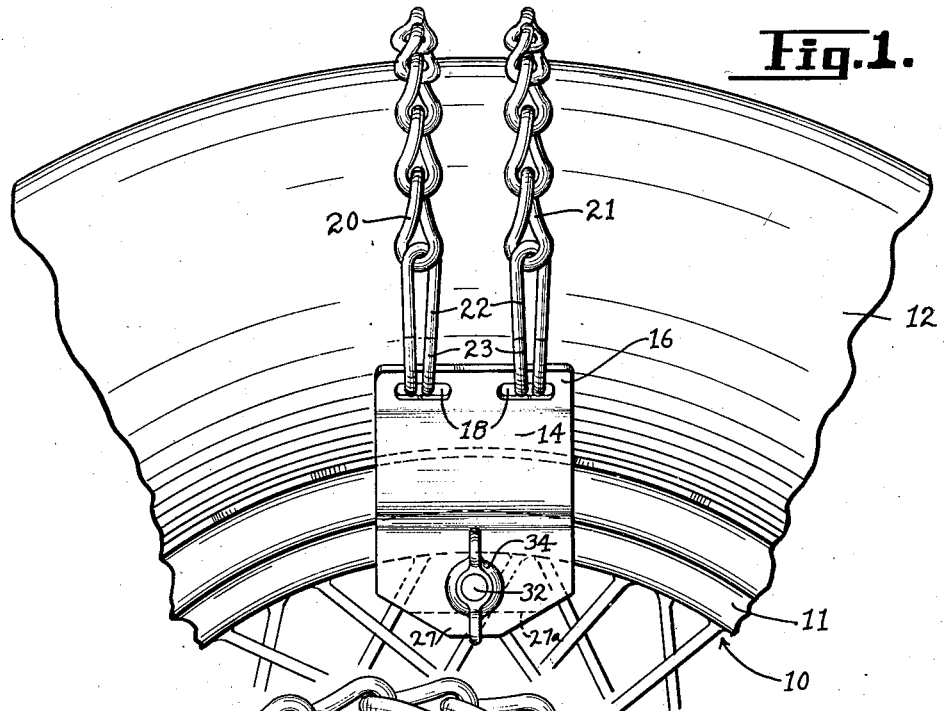
Fig. 1 represents a side elevation of a portion of an automobile wheel rim and tire with the invention shown applied thereto.

Referring now to the drawing in which like reference numerals denote corresponding parts throughout the several views, the numeral 10 indicates generally a conventional form of automobile wire wheel having a stepped rim 11 for holding the usual tire shoe 12 and inner tube 13 on the outer side thereof.

The improved emergency chain includes a pair of undulated side plates 14 and 15, preferably formed of heavy sheet metal, and adapted to lie in an inclined position against the edges of the rim 11. The upper ends of the plates 14 and 15 are each formed with an outwardly inclined flange 16, 17, each of said flanges being provided with a pair of elongated slots 18 and 19 passing therethrough.

A pair of cross-chains 20 and 21 are adapted to be attached to the side plates 14 and 15 by means of attaching links 22 secured to the opposite end links of each cross-chain 20 and 21.

Each attaching link 22 has a pair of bent-over hooked extremities 23 which are adapted to be inserted through the elongated slots 18 and 19 in the plate flanges 16 and 17, and preferably enclosed thereabout. It is within the scope of the present invention, however, to leave said extremities 23 open sufficiently to permit removal of the plates therefrom.

Figure 2:
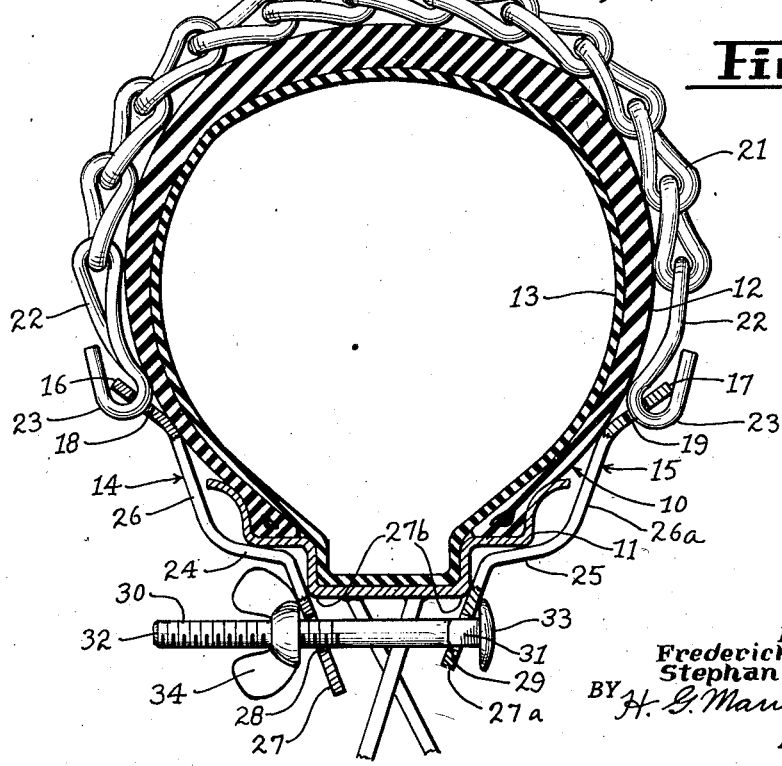
Fig. 2 is a transverse cross-section through the same, showing an end view of an emergency tire chain with portions broken away for clearness.

The plates 14 and 15 are provided with intermediate outwardly convex sections 24, 25, terminating in flat top and bottom ear members 26, 26a, and 27, 27a, respectively. The top ears 26, 26a are adapted to lie against the tire 12, while the bottom ears 27, 27a engage the inner shoulders 27b of the tire rim which serves as a fulcrum. The ear 27 of the front plate 14 is preferably made somewhat longer than the ear 27a of the rear plate 15, as best shown in Fig. 2. The front ear 27 is provided with a round aperture 28, while the short ear 27a has a square aperture 29,—said apertures being adapted to receive the threaded section 30 and the squared section 31, respectively, of a carriage bolt 32 having a round head 33. The threaded outer section 30 of the bolt 32 is provided with a wing-nut 34 for securely holding the side plates 14 and 15 in detachable inclined position on the wheel rim 11.

Operation

In the operation of applying the emergency chain upon the tire 12, the bolt 30 and wing nut 34 will first be removed from the front plate 14. The rear plate 15 will then be positioned behind the wheel and against the inside of the wheel rim 11, as shown, whereupon the threaded section of the bolt 30 may be inserted forwardly between any two adjacent wheel spokes. The cross-chains 20 and 21 will then be placed about the tread section of the tire 12 and the aperture 28 in the front plate 14 brought into registry with the bolt 30 and slipped thereover, so as to bring said plate 14 against the front surface of the rim 11. Finally, the wing-nut 34 will be assembled upon the bolt 30 and tightened to draw the depending ears 27 and 27a and plates 14 and 15 together, as shown in Fig. 2.

It is to be noted that as the nut 34 is tightened, the plates 14 and 15 will abut against the projecting shouldered sections of the wheel rim 11, and by leverage action, will tend to force the outer end of the plate away from the tire 12, causing the cross-chains 20 and 21 to be drawn tightly against the tread section thereof.

One advantage of the present invention is that the clamping plates 14 and 15 will be held tightly in position upon the rim 11 by the tension of the cross-links 20 and 21, and the resiliency of the air-filled tire 12 will prevent the cross-chains from creeping. It will be understood that, if desired, the inner surfaces of the side plates 14 and 15 may be lined with a strip of felt or other soft material to prevent all possibility of the wheel rim from scratching.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claim.

Having thus fully described the invention, what is claimed as new and for which it is desired to secure Letters Patent, is:

In an emergency tire chain, a pair of inclined side plates, a cross-chain connected to the outer sections of said plates, a threaded bolt passing through the inner sections of said plates, and nut means on said bolt for drawing said plates against the shoulders of the tire rim as fulcra, said fulcra engaging said plates at points closer to the inner ends of said plates than the outer ends thereof to cause a large movement of said outer ends of said plates to tighten the chain about the tire.

FREDERICK KUNZ.
STEPHAN A. MINERY.